US00RE45562E

(19) United States
(12) Reissued Patent
Blaha et al.

(10) Patent Number: US RE45,562 E
(45) Date of Reissued Patent: Jun. 16, 2015

(54) CARD SHUFFLING DEVICES AND RELATED METHODS

(75) Inventors: Ernst Blaha, Tullnerbach (AT); Peter Krenn, Neufeld (AT)

(73) Assignee: Shuffle Master GMBH & CO KG, Vienna (AT)

(21) Appl. No.: 14/094,706

(22) Filed: Dec. 2, 2013

Related U.S. Patent Documents

Reissue of:

(64) Patent No.: 6,659,460
Issued: Dec. 9, 2003
Appl. No.: 10/009,411
PCT Filed: Mar. 26, 2001
PCT No.: PCT/AT01/00088
§ 371 (c)(1),
(2), (4) Date: Dec. 10, 2001
PCT Pub. No.: WO01/78854
PCT Pub. Date: Oct. 25, 2001

U.S. Applications:

(63) Continuation of application No. 13/300,733, filed on Nov. 21, 2011, now Pat. No. Re. 44,616, which is a continuation of application No. 11/299,243, filed on Dec. 9, 2005, now Pat. No. Re. 42,944, which is an application for the reissue of Pat. No. 6,659,460.

(30) Foreign Application Priority Data

Apr. 12, 2000 (AT) ..... 634/2000

(51) Int. Cl.
*A63F 1/12* (2006.01)
*A63F 1/14* (2006.01)

(52) U.S. Cl.
CPC .... *A63F 1/12* (2013.01); *A63F 1/14* (2013.01)

(58) Field of Classification Search
CPC ..... A63F 1/12; A63F 1/14
USPC ..... 273/149 R, 149 P
See application file for complete search history.

(56) References Cited

U.S. PATENT DOCUMENTS

| | | | | |
|---|---|---|---|---|
| 4,497,488 | A | 2/1985 | Plevyak et al. | |
| 4,512,580 | A | 4/1985 | Matviak | 273/148 A |
| 4,515,367 | A * | 5/1985 | Howard | 273/149 R |
| 4,586,712 | A | 5/1986 | Lorber et al. | 273/149 R |
| 4,659,082 | A | 4/1987 | Greenberg | 273/149 R |
| 4,667,959 | A | 5/1987 | Pfeiffer et al. | 273/149 R |
| 4,770,421 | A | 9/1988 | Hoffman | |
| 4,832,342 | A | 5/1989 | Plevyak et al. | 273/149 R |
| 5,240,140 | A | 8/1993 | Huen | 221/13 |
| 5,275,411 | A | 1/1994 | Breeding | |
| 5,431,399 | A * | 7/1995 | Kelley | 273/149 R |
| 5,575,475 | A * | 11/1996 | Steinbach | 273/149 R |
| 5,683,085 | A | 11/1997 | Johnson et al. | 273/149 R |
| 5,695,189 | A | 12/1997 | Breeding et al. | 273/149 R |
| 5,944,310 | A | 8/1999 | Johnson et al. | 273/149 R |
| 5,989,122 | A | 11/1999 | Roblejo | |
| 6,019,368 | A | 2/2000 | Sines et al. | |
| 6,068,258 | A | 5/2000 | Breeding et al. | 273/149 R |

(Continued)

FOREIGN PATENT DOCUMENTS

| | | |
|---|---|---|
| EP | 0777514 | 2/2000 |
| WO | 99/52611 | 10/1999 |

*Primary Examiner* — Benjamin Layno
(74) *Attorney, Agent, or Firm* — TraskBritt

(57) ABSTRACT

A card shuffler is disclosed having a card output portion that is easily connectable to either a first output card receiver or a second output card receiver. The first output card receiver enables the dealer to remove cards one at a time from the shuffler. The second output card receiver enables the dealer to remove a group of cards at a time from the shuffler.

20 Claims, 5 Drawing Sheets

(56) References Cited

U.S. PATENT DOCUMENTS

| | | | | |
|---|---|---|---|---|
| 6,139,014 | A | 10/2000 | Breeding et al. | 273/149 R |
| 6,149,154 | A | 11/2000 | Grauzer et al. | 273/149 R |
| 6,165,069 | A | 12/2000 | Sines et al. | |
| 6,254,096 | B1 | 7/2001 | Grauzer et al. | 273/149 R |
| 6,267,248 | B1 | 7/2001 | Johnson et al. | 209/547 |
| 6,270,404 | B2 | 8/2001 | Sines et al. | |
| 6,299,534 | B1 | 10/2001 | Breeding et al. | |
| 6,325,373 | B1 | 12/2001 | Breeding et al. | 273/149 R |
| 6,454,266 | B1 | 9/2002 | Breeding et al. | |
| 6,588,750 | B1 | 7/2003 | Grauzer et al. | |
| 6,588,751 | B1 | 7/2003 | Grauzer et al. | |
| 6,629,889 | B2 | 10/2003 | Mothwurf | |
| 6,651,985 | B2 | 11/2003 | Sines et al. | |
| 6,663,490 | B2 | 12/2003 | Soltys et al. | |
| 6,688,979 | B2 | 2/2004 | Soltys et al. | |
| 6,712,696 | B2 | 3/2004 | Soltys et al. | |
| 6,722,974 | B2 | 4/2004 | Sines et al. | |
| 6,758,751 | B2 | 7/2004 | Soltys et al. | |
| 2002/0063389 | A1 | 5/2002 | Breeding et al. | |

* cited by examiner

CARD SHUFFLING DEVICES AND RELATED METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 6,659,460. This reissue application is a continuation reissue application of Reissue application Ser. No. 13/300,733, filed Nov. 21, 2011, now U.S. Pat. No. RE44,616, issued Dec. 3, 2013, which is a continuation reissue of Reissue application Ser. No. 11/299,243, filed Dec. 9, 2005, now U.S. Pat. No. RE42,944, issued Nov. 22, 2011, each of which is also a reissue application of U.S. Pat. No. 6,659,460, issued Dec. 9, 2003, to Blaha et al.*

CROSS REFERENCE TO RELATED APPLICATIONS

Applicants claim priority under 35 U.S.C. §119 of Austrian Application No. A 634/2000 filed Apr. 12, 2000. Applicants also claim priority under 35 U.S.C. §120 of PCT/AT01/00088 filed Mar. 26, 2001. The international application under PCT article 21(2) was not published in English.

*TECHNICAL FIELD*

The invention relates to a card shuffler.

*BACKGROUND*

An example of a shuffling device is described in U.S. Pat. No. 4,659,082. In this known [shufflering] *shuffling* apparatus the shuffling vessel is formed by a horizontally arranged drivable drum which is provided with radially extending shafts for receiving a card each. An input station for receiving a stack of discarded playing cards is provided through which the individual shafts of the drum are supplied. The storage container for the shuffled cards is supplied by the drum. Following the activation of a card ejector, the individual cards are pushed into the storage container at random.

A similar card shuffler has become known from U.S. Pat. No. 4,586,712 in which the drum is vertical.

A very high degree of shuffling is achieved with such card shufflers. The foreseeability of the card sequence in the shuffled card stack is virtually impossible for a third party even in the case of using electronic aids.

In these known solutions there are card storage means for retrieving the shuffled cards individually. This leads to the disadvantage, however, that such card shufflers can only be used for certain games, but not for such games where a removal in stacks of the shuffled cards is provided.

A card shuffling apparatus with an output apparatus for retrieving cards is described in U.S. Pat. No. 5,683,085 A which by way of a respective activation can be supplied from the shuffling storage means not only with individual cards, but also with several cards, so that an entire stack of cards can be taken from the output apparatus.

From U.S. Pat. No. 5,989,122 A, a card shuffling apparatus is known which also conveys entire playing card stacks to an intended output apparatus.

The differentiation whether or not entire stacks of cards or merely individual cards are conveyed to the output apparatus is solved in the last two documents electronically. The output apparatuses per se remain the same and can thus not be adapted to the different card games.

It is the object of the present invention to avoid this disadvantage and to propose a card shuffler of the kind mentioned above which can be used for both types of games.

The proposed measures lead to a modular arrangement of the card shuffler, with an exchange of the card storage means for the shuffled cards being possible in a simple way. A card storage means for the individual retrieval of cards can be replaced for example very simply by one for the retrieval of cards in stacks and vice-versa.

Principally, the receiving means can be provided with any desired arrangement and can comprise groove- and spring-shaped shapings, for example with which the card storage means and the basic body mutually engage. The fixing can be provided by means of a fixable alignment pin for example. It is also possible, however, to provide connections by clips or snap-in connections such as spring-loaded balls or pins as receiving means for the card storage means which latch into respective latching recesses of the card storage means or the basic body of the shuffler.

In one embodiment, the content of each compartment of the shufflers storage means is securely pushed into a nip line between two rollers during the output which convey the same into the card storage means for the shuffled cards.

This also allows shuffling more than one card into a compartment of the shuffling storage means and thus keeping the card shuffler relatively small. This allows operating such a shuffler on a game table even when a larger number of card stacks, such as six or eight, are in the game and need to be managed. The nip rollers can either be provided with an elastically deformable coating or be pressed in a resilient way against one another which also allows an adjustment to the thickness of the content of the compartment to be ejected which can also hold several cards, e.g. a card stack with nine cards.

In one embodiment, the card shuffling storage means is a drum having radially arranged compartments. The cards are held in the individual compartments and cannot slip outwardly by centrifugal force and thus prevent any contact of the cards with a housing enclosing the drum. This leads to a very substantial protection of the cards.

Moreover, in the case of any required exchange of a drum, it is not necessary to remove the cards from the compartment of the same. Instead, the drum including the cards contained in the same can be exchanged.

In one embodiment, a card sensor is provided to detect the cards used in a game. It is not only possible to check their number, but also the card picture, as a result of which any changes to the cards can be recognized.

*BRIEF DESCRIPTION OF THE DRAWINGS*

The invention is now explained in closer detail by reference to the enclosed drawings, wherein.

*DETAILED DESCRIPTION*

Figure 6:
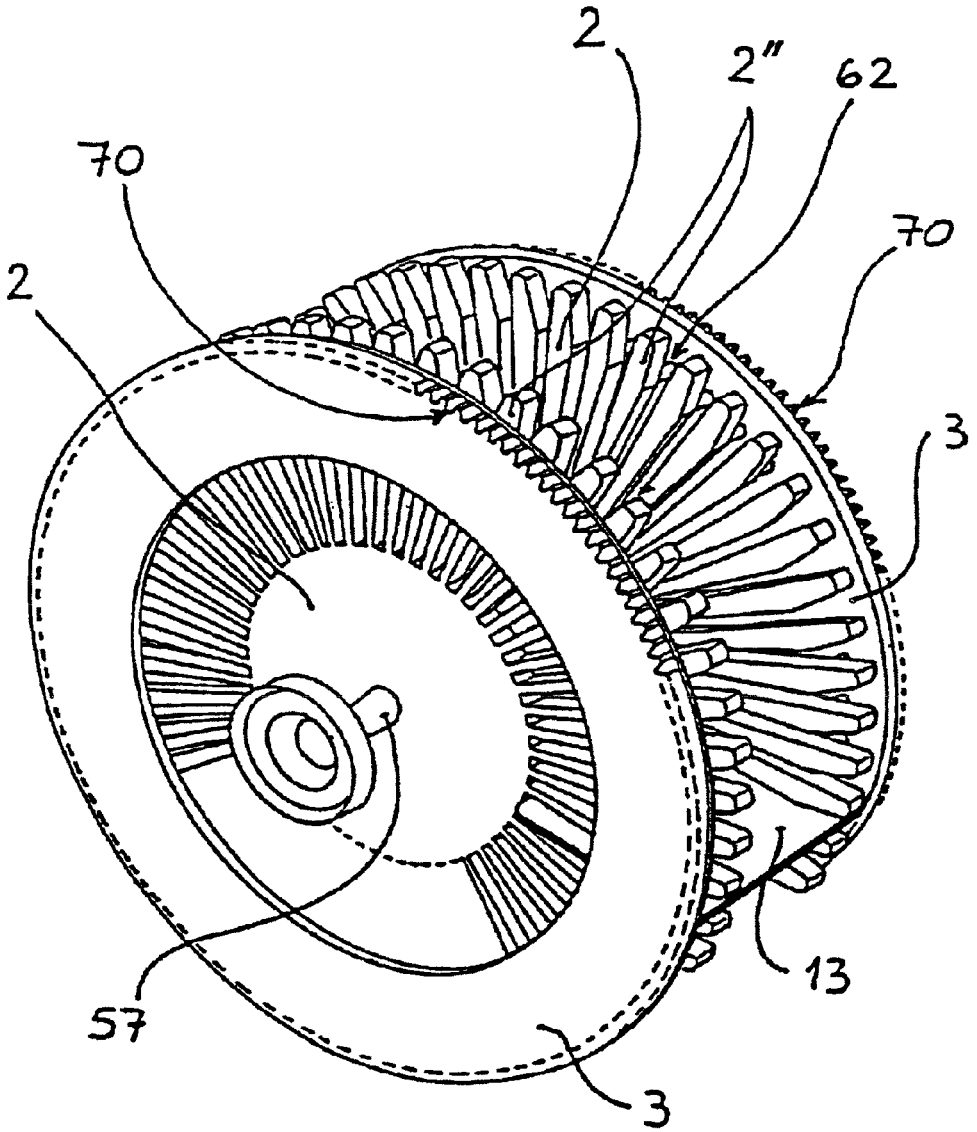
FIG. 6 shows an axonometric representation of the shuffling storage means.

On a base plate 1 (*FIG. 1*), a shuffling storage means 2' is disposed on a console formed by two legs 9, which shuffling storage means is formed by a rotatably held drum 2. Said drum 2 is connected to two disks 3 via spacers 62 (FIG. 6). The flanges 2" of the drum 2 are provided with compartment-like slots 69 which are provided for receiving cards.

Said disks 3 are each provided with a circumferential toothing 70. The shuffling storage means 2' can be driven via a pinion 4 and a toothed pulley 5 which is rigidly connected to the same and are jointly held rotatably in plates 25, and a toothed belt 6 via a second toothed pulley 7 and a motor 8. This motor 8 is triggered via a randomizer and optionally also moves the shuffling storage means 2' in mutually opposite directions, so that an oscillating movement of the shuffling storage means 2' can occur.

Figure 2:
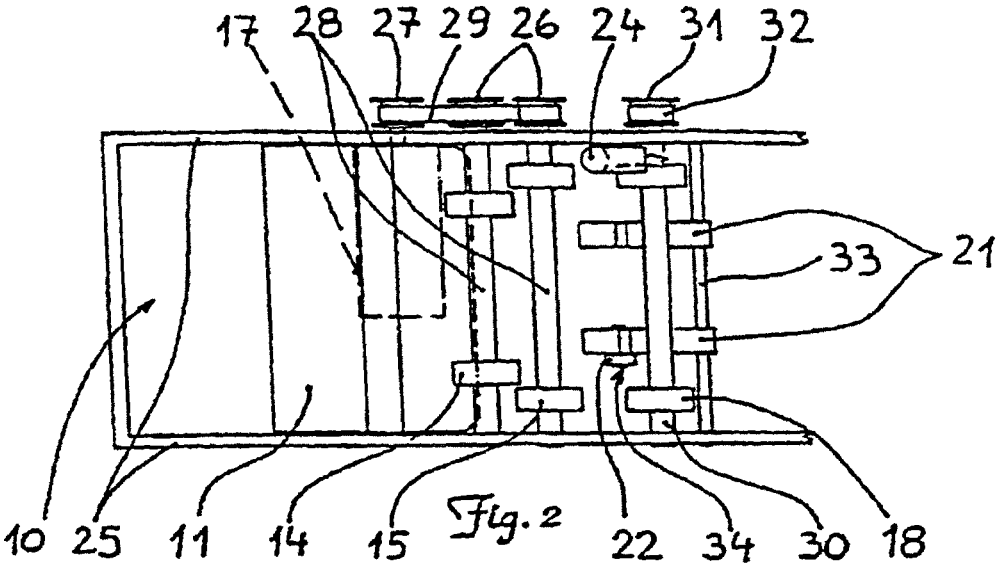
FIG. 2 shows a top view of the input device.

A reservoir 10 [for the] *for* discarded cards 13 is provided which is part of an input apparatus. It comprises a wedge 11 which is rolled off by a roller 12 which is arranged rotatably within the same on an inclined floor of the reservoir 10 against two elastic rollers 14 (FIG. 2). The two rollers 14 are rotatably held in the two plates 25 on a common shaft 28 and can be driven by way of two belt pulleys 26, a toothed belt 29 as well as a belt pulley 27 via a motor 17 jointly with the rollers 15. Two rollers 16 touch the two rollers 15 on the circumference, so that they can be co-rotated by surface friction.

A sensor 24 is provided as a line sensor for recognizing the card symbol of the respectively moved card 13.

The pair of rollers 19 and the pair of rollers 18 which touch the same on the circumference and are each situated on shaft 30 can be driven in the same manner as described above by motor 23.

The two levers 21 are used for the complete insertion of the respectively moved card into a compartment 69 of the shuffling storage means 2' and are oscillatingly drivable by way of a rod 22 which is swivelably connected with the lever 21 by the axle 34 by way of an eccentric disk 23 disposed on the motor.

Two variants are provided for the card storage means 42, 42' (*FIG. 1, FIG. 4*) for the shuffled cards 13, which storage means can optionally be fastened to the base plate 1 and can easily be mutually exchanged.

A receiving means is provided which comprises two alignment pins 100 which are inserted in the base plate 1 and on which a card storage means 42, 42' for shuffled cards can be inserted. The card storage means 42, 42' is provided with respective bores 102 in its base. In order to fix the respective card storage means 42, 42', a screw 101 is provided which engages in a threaded bore 103 of the card storage means 42, 42'.

A receiving means for the card storage means 42, 42' can also use clip connectors to connect to the card storage means 42, 42', or a recess can be formed in the base plate 1 into which the card storage means 42, 42' can be inserted.

Figure 3:
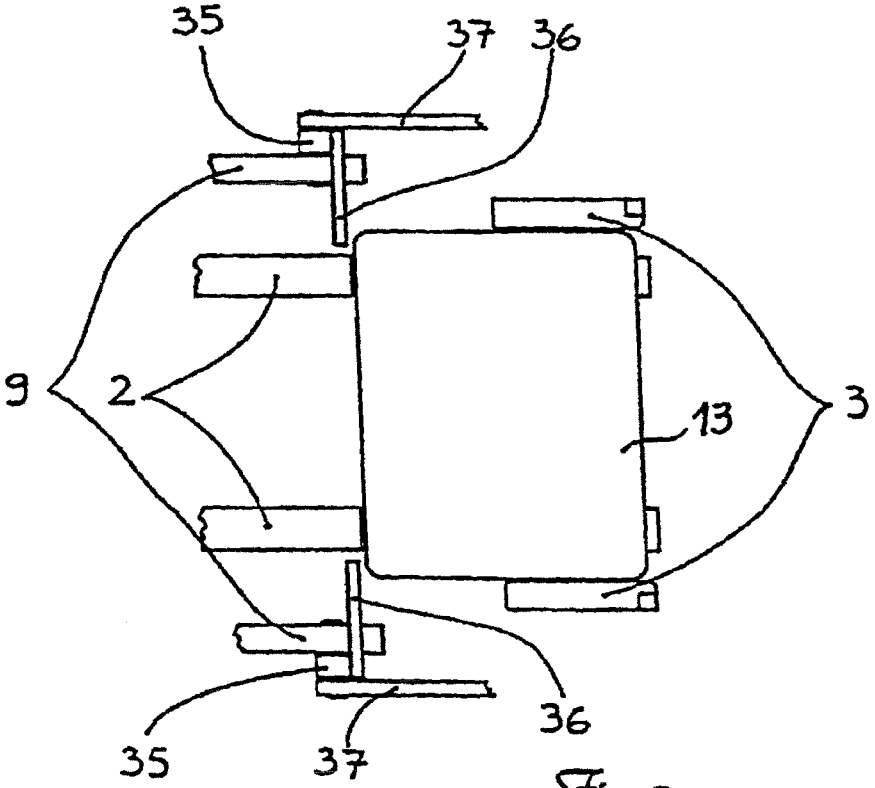
FIG. 3 shows a detail of an output device.

The output of cards 13 from the compartments 69 into a card storage means 42, 42' is performed by means of two swivel arms 35 which are swivelably held in the two legs 9 and are oscillatingly drivable by way of levers 37 and by way of an eccentric disk 38 situated on a motor. Said two swivel arms 35 each carry at their upper ends an inwardly positioned rail 36 (FIG. 3) which grasps the cards disposed in a compartment 69 and conveys them to a nip gap of two grip rollers 40. Said grip rollers 40 are held in the plates 45 and are simultaneously drivable by a motor 41.

Figure 1:
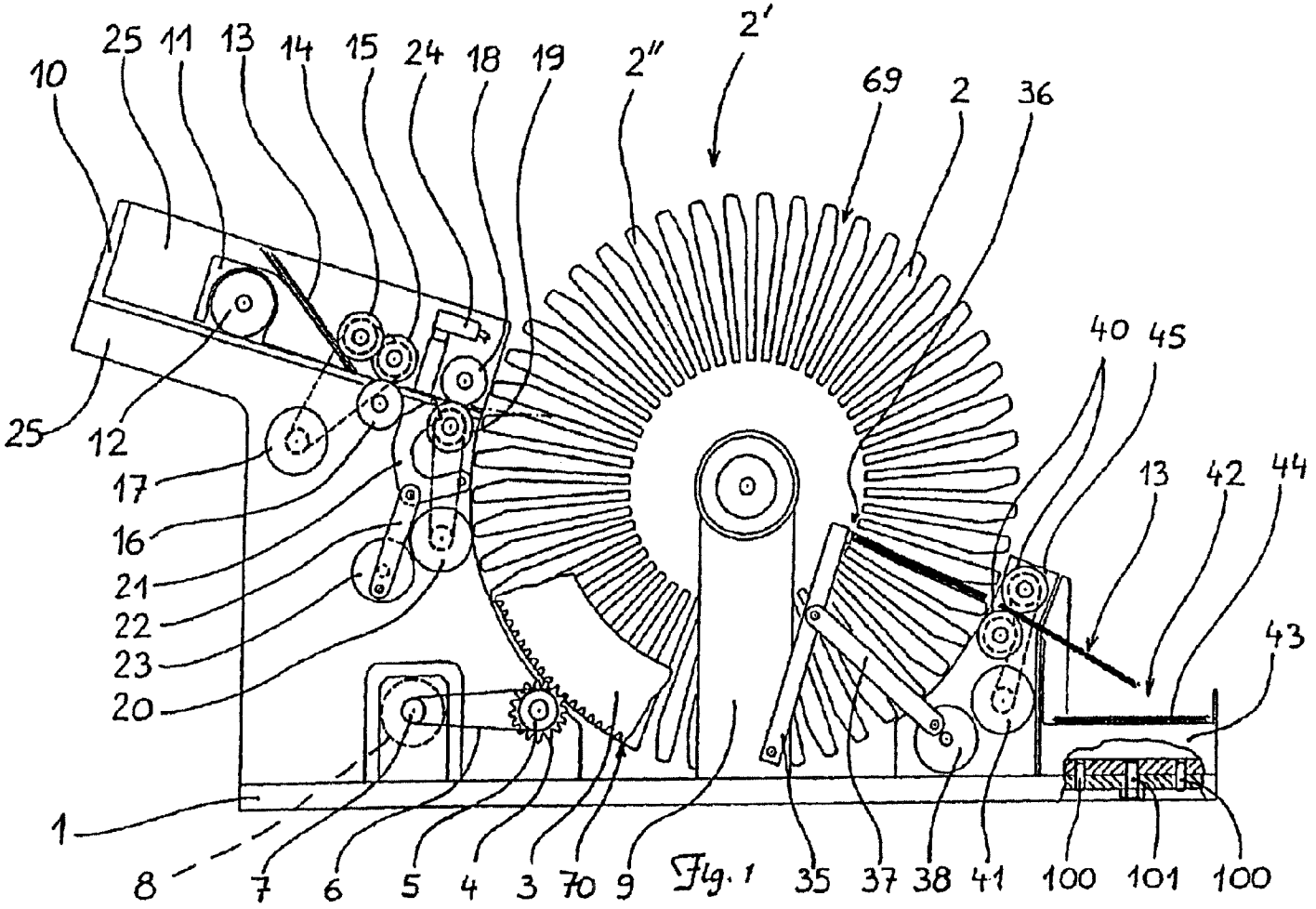
FIG. 1 schematically shows a card shuffler in accordance with the invention in which a cover has been removed.

The grip rollers 40 convey the respectively moved cards 13 either into the card storage means 42 for the shuffled cards as shown in FIG. 1 for a stack-by-stack removal of the cards 13, or into a card storage means 42' for a one-by-one removal of shuffled cards.

A card storage means 42 is substantially formed by a U-shaped table 43 in which the cards 13 are deposited in a stack 44. The cards can be removed upwardly by the croupier stack-by-stack if necessary.

Figure 4:
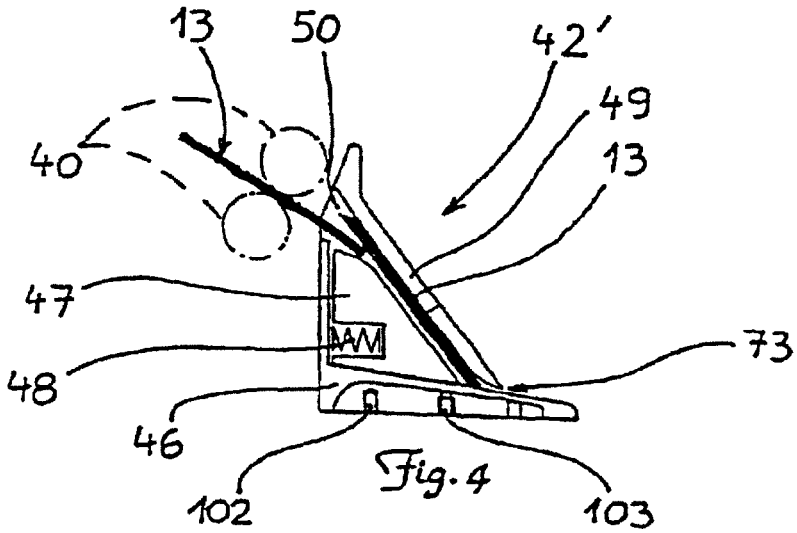
FIG. 4 shows a card storage means for the one-by-one output of shuffled cards.
Figure 4A:
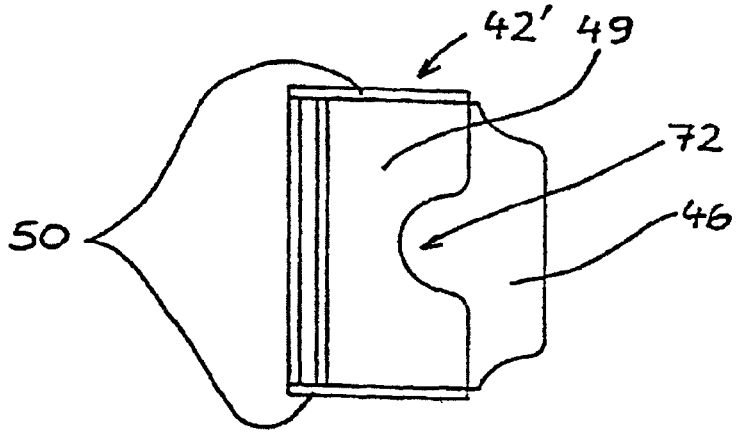
FIG. 4A shows a top view of the card storage means according to FIG. 4.

The reservoir 42' according to FIGS. 4 and 4A is provided for a one-by-one removal of cards 13. The cards emerging from the nip gap of the grip rollers 40 enter the card storage means 42' through a gap 50 which is limited by an oblique downwardly extending wall 49 and a spring-loaded shoe 47. The cards 13, which also include several of the same simultaneously, are pushed between the shoe 47 and the wall 49 or the cards already disposed in the card storage means 42', with the shoe 47 being pushed back against the force of the spring 48. The shoe 47 slides over an inclined plane of an L-shaped basic body 46. A gap 73 remains between the lower edge of the wall 49 and the L-shaped basic body 46, through which gap cards 13 can be retrieved one-by-one.

As is shown in FIG. 4A, the inclined wall 49 is provided at its lower edge with a centrally arranged recess 72 which is open on its edge and facilitates the withdrawal of the individual cards. The card storage means 42' is limited on the side by walls 50. The shuffled cards can be retrieved by the croupier individually in that the respectively foremost of the playing cards 13 is grasped through recess 72 in the wall 49 and is pulled through the gap 73.

Figure 5:
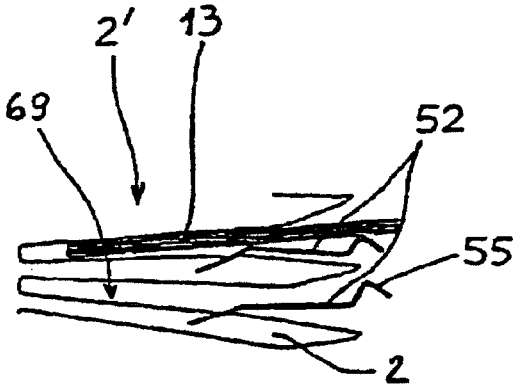
FIGS. 5 and 5A show details of variants of the arrangement of compartments of the shuffling storage means.
Figure 5A:
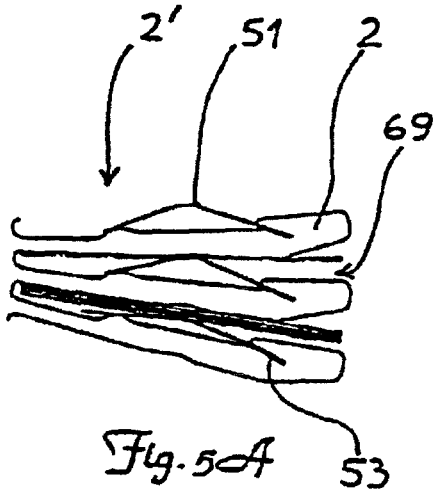

As is shown in FIGS. 5 and 5A, springs 51, 52 are arranged in the compartments 69 of the shuffling storage means 2', which springs ensure the clamping of the card(s) inserted into the respective compartment 69.

The spring 52 is provided with a bending 55 which covers the radially outer openings of the compartments 69 and prevents securely that cards are ejected outwardly by centrifugal force during the rotation of the shuffling storage means 2'.

The springs 51 according to FIG. 5A are arranged as curved or bent leaf springs and are inserted in a slot 53 of the one wall of the compartment 69 and press against the respectively opposite wall of compartment 69. The card inserted into the respective compartment 69 is clamped between said spring 51 and the opposite wall of compartment 69 and held in this way in the respective compartment 69.

The output of the cards of a compartment 69 is carried out in such a way that the card 13 or a stack of up to nine cards for example is ejected by force. This is carried out by means of the swivel arms 35 and rails 36, as already explained above. The springs 51, 52 are deformed during the ejection of the card(s) 13.

As is shown in FIGS. 1 and 6, drum 2 rests with axle journals 57 in receiving means of legs 9 and can be removed or lifted from the same with ease. Since the compartments 69 are provided with springs 51, 52, the cards 13 can remain in their compartments during the removal of drum 2.

Figure 7:
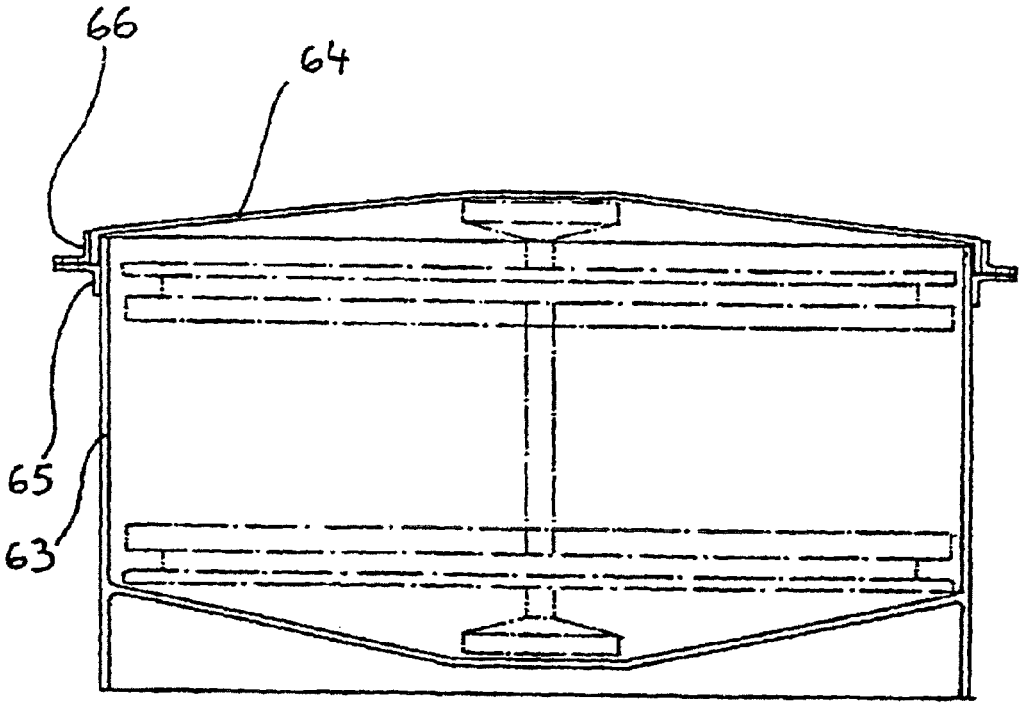
FIG. 7 shows a security container with a shuffling storage means[;].

The drum 2 can be placed in a security container 63 (FIG. 7) and can be transported in the same, with the container 63 being sealable with a lid 64. For this purpose, flanges 65, 66 are fastened on container 63 and the lid 64. This allows connecting the container 63 with the lid 64 in a manner so as to be secure against manipulations or to lock the same.

What is claimed is:

[1. A playing card shuffling device comprising:

a card input portion for receiving cards to be shuffled;

a card shuffling portion for receiving cards from the card input portion and outputting shuffled cards to a card outlet portion; and the card outlet portion being adapted for coupling to a first output card receiver when it is desired to remove shuffled cards one at a time from the shuffling device, and the card outlet portion being adapted for coupling to a second output card receiver when it is desired to remove a group of shuffled cards at a time from the shuffling device.]

[2. The device of claim 1 wherein the card outlet portion comprises first alignment features for aligning with corresponding second alignment features on the first output card receiver and the second output card receiver.]

[3. The device of claim 2 wherein the first alignment features on the card outlet portion comprise alignment pins.]

[4. The device of claim 1 further comprising the second output card receiver coupled to the card outlet portion, the second output card receiver comprising a U-shaped table for receiving shuffled cards from the card outlet portion to facilitate grasping of a group of cards on the U-shaped table.]

[5. The device of claim 1 further comprising the first output card receiver coupled to the card outlet portion, the first output card receiver having an output gap for exposing a portion of a single card for removal of cards one at a time from the output gap.]

[6. The device of claim 1 wherein the card outlet portion comprises grip rollers for forwarding one or more cards from the card shuffling portion to the first output card receiver or the second output card receiver coupled to the card outlet portion.]

[7. The device of claim 1 wherein the card shuffling portion comprises movable card compartments, each compartment having an open end, the card shuffling portion further comprising a drivable lever for ejecting one or more cards from a compartment for being forwarded to the first output card receiver or the second output card receiver coupled to the card outlet portion.]

[8. The device of claim 1 wherein the card shuffling portion comprises a a rotatable drum having radially arranged compartments.]

[9. The device of claim 8 wherein the drum is provided with gear teeth around its periphery engaged with the drivable pinion for rotating the drum.]

[10. The device of claim 8 wherein each compartment comprises a spring with a bend at a free end of the spring to help retain cards within a compartment.]

[11. The device of claim 8 wherein each compartment comprises opposing walls and an open end, each compartment comprising a retainer spring that is pre-tensioned against one of the walls of the compartments to retain cards within the compartment.]

[12. The device of claim 1 further comprising a sensor for recognizing identities of cards.]

[13. The device of claim 1 wherein the card output portion includes clip connectors for connecting the first output card receiver or the second output card receiver to the card outlet portion.]

[14. The device of claim 1 wherein the card outlet portion includes a recess for the first output card receiver or the second output card receiver.]

[15. The device of claim 1 wherein the card outlet portion includes one of alignment pins and holes, and the first output card receiver and second card receiver includes one of alignment pins and holes for coupling to the card outlet portion.]

[16. The device of claim 1 wherein the card outlet portion is secured to the first output card receiver or the second output card receiver by means of a screw.]

[17. The device of claim 1 further comprising the first output card receiver, the first output card receiver comprising a spring loaded plate urging cards against a wall, the first card receiver further comprising an output gap for removal of one card at a time from the output gap.]

[18. The device of claim 1 further comprising the first output card receiver coupled to the card outlet portion.]

[19. The device of claim 1 further comprising the second output card receiver coupled to the card outlet portion.]

[20. A method performed on a shuffling device, comprising the steps of: providing a shuffling device comprising a card input portion for receiving cards to be shuffled; providing a card shuffling portion for receiving cards from the card input portion and outputting shuffled cards to a card outlet portion; providing a first output card receiver wherein the card outlet portion is adapted for coupling to the first output card receiver when it is desired to remove shuffled cards one at a time from the shuffling device and providing a second output card receive wherein the card outlet portion is adapted for coupling to the second output card receiver it is desired to remove a group of shuffled cards at a time from the shuffling device; and coupling either the first output card receiver or the second card output receiver to a coupling mechanism on the card outlet portion depending on whether it is desired to remove shuffled cards one at a time from the shuffling device or remove a group of shuffled cards at a time from the shuffling device. ]

*21. A card-shuffling device, comprising:*

*a base comprising an attachment feature;*

*a card input configured to receive cards and input the cards into the card-shuffling device, the card input being supported by the base;*

*a card-shuffling mechanism configured to receive cards from the card input and randomize the cards, the card-shuffling mechanism being supported by the base; and*

*a card output receiver module configured to receive cards from the card-shuffling mechanism and to position the cards for manual removal, the card output receiver module comprising an attachment feature, the attachment feature of the card output receiver module being configured to secure the card output receiver module to the base by mating with the attachment feature of the base.*

*22. The card-shuffling device of claim 21, wherein the attachment feature of the base and the attachment feature of the card output receiver module jointly form a quick-release attachment mechanism.*

*23. The card-shuffling device of claim 21, wherein the attachment features of the base and the card output receiver module comprise at least one of a receiving ledge and a latch, clip connectors, a receiving bore and a spring-loaded pin, and a snap-in connection.*

*24. The card-shuffling device of claim 23, wherein the attachment features of the base and the card output receiver comprise a receiving ledge and a latch.*

*25. The card-shuffling device of claim 21, further comprising an alignment feature on the base and an alignment feature on the card output receiver module, the alignment feature of the card output receiver module being configured to mate with the alignment feature of the base to orient the card output receiver module for attachment to the base.*

*26. The card-shuffling device of claim 25, wherein the alignment features of the base and the card output receiver module comprise at least one of a bore and a pin and a snap-in connection.*

*27. The card-shuffling device of claim 21, further comprising another card output receiver module configured to be interchanged with the card output receiver module, the other card output receiver module being configured to receive cards from the card-shuffling mechanism and to position the cards for manual removal, the other card output receiver module comprising another attachment feature, the other attachment feature being configured to secure the other card output receiver module to the base by mating with the attachment feature of the base.*

*28. The card-shuffling device of claim 27, wherein one of the card output receiver module and the other card output receiver module is configured to present a stack of cards for withdrawal and the other of the card output receiver module and the other card output receiver module is configured to present one card at a time for withdrawal.*

*29. The card-shuffling device of claim 21, wherein the card-shuffling mechanism comprises:*

*compartments, at least one of the compartments being sized and configured to receive at least one card at least partially into the at least one of the compartments; and*

*a spring configured and positioned to prevent the at least one card from exiting the at least one of the compartments during movement of the card-shuffling mechanism.*

*30. The card-shuffling device of claim 29, wherein the spring comprises a bent distal end at least partially covering an opening of the at least one compartment.*

*31. The card-shuffling device of claim 29, wherein the spring comprises a leaf spring pressing against a wall of the at least one of the compartments to clamp the at least one card between the leaf spring and the wall.*

*32. The card-shuffling device of claim 21, further comprising a sensor configured to detect a presence of each card, the sensor being located between the card input and the card-shuffling mechanism.*

*33. A method of configuring a card-shuffling device, comprising:*

*providing a base comprising an attachment feature;*

*supporting a card input utilizing the base, the card input being configured to receive cards and input the cards into a card-shuffling mechanism;*

*supporting the card-shuffling mechanism utilizing the base, the card-shuffling mechanism being configured to receive cards from the card input and randomize the cards; and*

*securing a card output receiver module to the base by mutually engaging an attachment feature of the card output receiver module with the attachment feature of the base, the card output receiver module being configured to receive cards from the card-shuffling mechanism and to position the cards for manual removal.*

*34. The method of claim 33, wherein securing the card output receiver module to the base comprises at least one of engaging a latch with a receiving ledge, clipping together clip connectors, positioning a spring-loaded pin to extend into a receiving bore, and snapping together a snap-in connection.*

*35. The method of claim 33, further comprising orienting the card output receiver module with respect to the base before securing the card output receiver module to the base by mating an alignment feature on the base with an alignment feature on the card output receiver module.*

*36. The method of claim 35, wherein orienting the card output receiver module with respect to the base comprises at least one of inserting a pin into a bore and snapping together a snap-in connection.*

*37. The method of claim 33, further comprising detaching the card output receiver module from the base and securing another card output receiver module to the base by mating another attachment feature of the other card output receiver module with the attachment feature of the base, the other card output receiver module being configured to receive cards from the card-shuffling mechanism and to position the cards for manual removal.*

*38. The method of claim 37, further comprising selecting one of the card output receiver module and the other card output receiver module to present a stack of cards for withdrawal and selecting the other of the card output receiver module and the other card output receiver module to present one card at a time for withdrawal.*

*39. The method of claim 33, wherein supporting the card-shuffling mechanism utilizing the base comprises supporting a card-shuffling mechanism comprising compartments, at least one of the compartments being sized and configured to receive at least one card at least partially into the at least one of the compartments; and a spring configured and positioned to prevent the at least one card from exiting the at least one of the compartments during movement of the card-shuffling mechanism utilizing the base.*

*40. The method of claim 33, further comprising supporting a sensor configured to detect a presence of each card utilizing the base, the sensor being positioned between the card input and the card-shuffling mechanism.*

* * * * *

UNITED STATES PATENT AND TRADEMARK OFFICE

CERTIFICATE OF CORRECTION

PATENT NO. : RE45,562 E
APPLICATION NO. : 14/094706
DATED : June 16, 2015
INVENTOR(S) : Ernst Blaha et al.

It is certified that error appears in the above-identified patent and that said Letters Patent is hereby corrected as shown below:

In the specification:
Column 1,

Please insert the following paragraph into the specification immediately following the TITLE and preceding the CROSS REFERENCE TO RELATED APPLICATIONS:

--Notice: More than one reissue application has been filed for the reissue of U.S. Patent 6,659,460. This reissue application is a continuation reissue application of Reissue Application Ser. No. 14/094,706, filed December 2, 2013, now U.S. Pat. No. RE45,562, issued June 16, 2015, which is a continuation reissue application of Reissue Application Ser. No. 13/300,733, filed November 21, 2011, now U.S. Pat. No. RE44,616, issued December 3, 2013, which is a continuation reissue of Reissue Application Ser. No. 11/299,243, filed December 9, 2005, now U.S. Pat. No. RE42,944, issued November 22, 2011, each of which is also a reissue application of U.S. Pat. No. 6,659,460, issued December 9, 2003, to Blaha et al. This application is the parent of Continuation Reissue Application Ser. No. 14/730,104, filed June 3, 2015, which is also a reissue application of US. Pat. No. 6,659,460, issued December 9, 2003, to Blaha et al.--

Please delete the following paragraph that appears on lines 13 through 21 of the reissued patent:

"*Notice: More than one reissue application has been filed for the reissue of US. Pat. No. 6,659,460. This reissue application is a continuation reissue application of Reissue application Ser. No. 13,300,733, filed Nov. 21, 2011, now U.S. Pat. No. RE44,616, issued Dec. 3, 2013, which is a continuation reissue of Reissue application Ser. No. 11/299,243, filed Dec. 9, 2005, now U.S. Pat. No. RE42,944, issued Nov. 22, 2011, each of which is also a reissue application of U.S. Pat. No. 6,659,460, issued Dec. 9, 2003, to Blaha et al.*"

Signed and Sealed this
Twenty-first Day of June, 2016

Michelle K. Lee

Michelle K. Lee
*Director of the United States Patent and Trademark Office*